Dec. 19, 1933.  R. W. OTT  1,940,142
MILLING MACHINE
Filed Dec. 26, 1930  5 Sheets-Sheet 1

Inventor
ROBERT W. OTT
By A. H. K. Parsons
Attorney

Dec. 19, 1933. R. W. OTT 1,940,142
MILLING MACHINE
Filed Dec. 26, 1930 5 Sheets-Sheet 3

Inventor
ROBERT W. OTT
By AHParsons
Attorney

Patented Dec. 19, 1933

1,940,142

UNITED STATES PATENT OFFICE 1,940,142

MILLING MACHINE

Robert W. Ott, Cincinnati, Ohio

Application December 26, 1930. Serial No. 504,815

19 Claims. (Cl. 90—21)

This invention relates to machine tools and more particularly to improvements in index tables for such machines.

One of the objects of this invention is to provide an improved table for hydraulically actuated machine tools.

Another object of this invention is to provide an improved index table for machine tools suitable for application to an hydraulically actuated slide whereby the same power means may be utilized for actuating the slide and indexing the table.

Another objects of this invention is to provide an improved hydraulically actuated index table.

Other objects and advantages of the present invention should be readily apparent by reference to the following specification considered in conjunction with the accompanying drawings illustrative of one embodiment thereof but it will be understood that any modifications may be made in the specific structural details hereinafter disclosed, within the scope of the appended claims, without departing from or exceeding the spirit of the invention.

Referring to the drawings in which like reference numerals indicate like parts.

This invention has been illustrated in connection with a milling machine but it will be understood that it may be embodied in any type of machine tool having an hydraulically actuated slide.

Figures 1, 10:
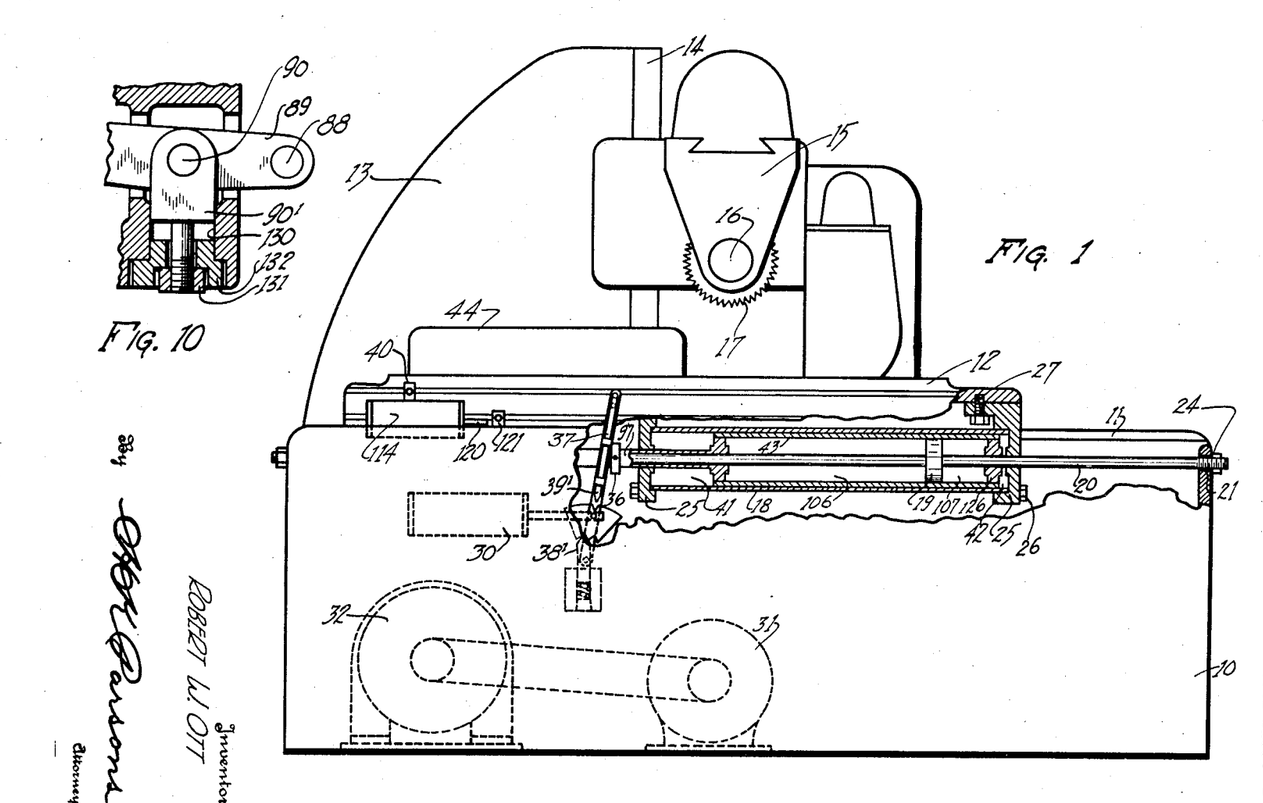
Figure 1 is an elevation of a milling machine embodying the principles of this invention.
Figure 10 is a detail section on the line 10—10 of Figure 3.

Referring to Figure 1 of the drawings, the reference numeral 10 indicates the bed portion of a machine tool having longitudinal guideways 11 formed in the top thereof for receiving a reciprocating carriage or slide 12. Uprising at one side of the bed is a column 13 having vertical guides 14 upon which is slidably mounted the spindle carrier 15. A cutter spindle 16 is journaled in the carrier for supporting a cutter 17 in opposed relation to the reciprocating carriage. The cutter spindle is adapted to be rotated by suitable known means.

Figure 8:
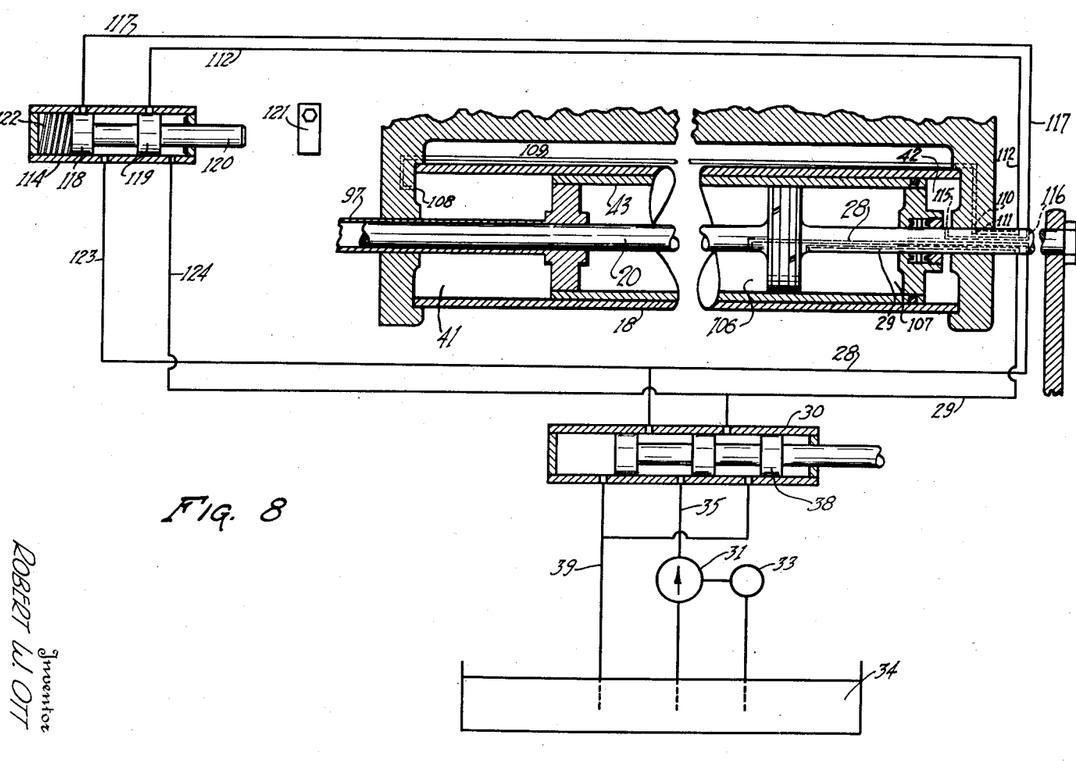
Figure 8 is a detail of the operating cylinder and hydraulic circuit.

The slide or carriage 12 is reciprocated on the ways 11 of the bed by hydraulic means comprising a cylinder 18 and a fixed piston 19. The piston 19 is formed integrally on a piston rod 20 which is fixed to the bed of the machine. Holes, such as 21, are formed in opposite walls of the bed for receiving the threaded ends of the piston rod upon which lock nuts 24 are threaded to apply tension to the piston rod and permanently fix it to the bed of the machine. The cylinder 18 comprises a tubular member mounted between opposed cylinder heads 25 and held in position by suitable means, such as tension rods 26. The cylinder heads are in the form of brackets for the purpose of attachment to the underside of the carriage as by bolts 27. Since the piston 19 is fixed it is evident that the admission of fluid pressure to the cylinder on either side of the piston will cause movement of the cylinder and thereby the slide in opposite directions. Pressure is conducted to the cylinder by means of channels, such as 28 and 29, Figure 8, formed in the interior of the fixed piston rod. These channels are connected to a reversing valve 30 for reversing the direction of flow and thereby changing the direction of movement of the reciprocating slide. Pressure is supplied by suitable means, such as a pump 31, driven by an electric motor 32 located in the base of the machine and a relief valve 33 is provided on the pressure side of the pump to prevent the building up of undue pressures when the machine is idle. The reservoir 34 is provided in the base of the machine from which fluid, such as oil, is supplied to the pump and into which the exhaust or return fluid from the system returns. The operation of the parts is as follows:

Pressure is supplied by the pump to the reversing valve 30 through the channel 35 and, in the position of the parts shown, fluid will flow through the channel 28 to the left side of the piston thereby causing movement of the table to the left. Upon continued movement a dog 36 attached to the rod 97 will engage the end of the lever 37, shifting the valve 38 and thereby establishing connection between the pressure line 35 and the channel 29 which will reverse the movement of the table. Suitable detent mechanism indicated generally by the reference numeral 38' may be provided for insuring completion of the valve movement initiated by the table. Simultaneously the channel 28 will be connected with the return line 39. By the use of an additional dog 40 attached to the table, a reciprocating cycle will be established and when it is desired to stop the table the lever 37 may be moved to a vertical or neutral position, and maintained therein by the manual actuated detent 39' having a slidable pin in the upper end thereof for locking the detent in an engaged or disengaged position.

Figure 2:
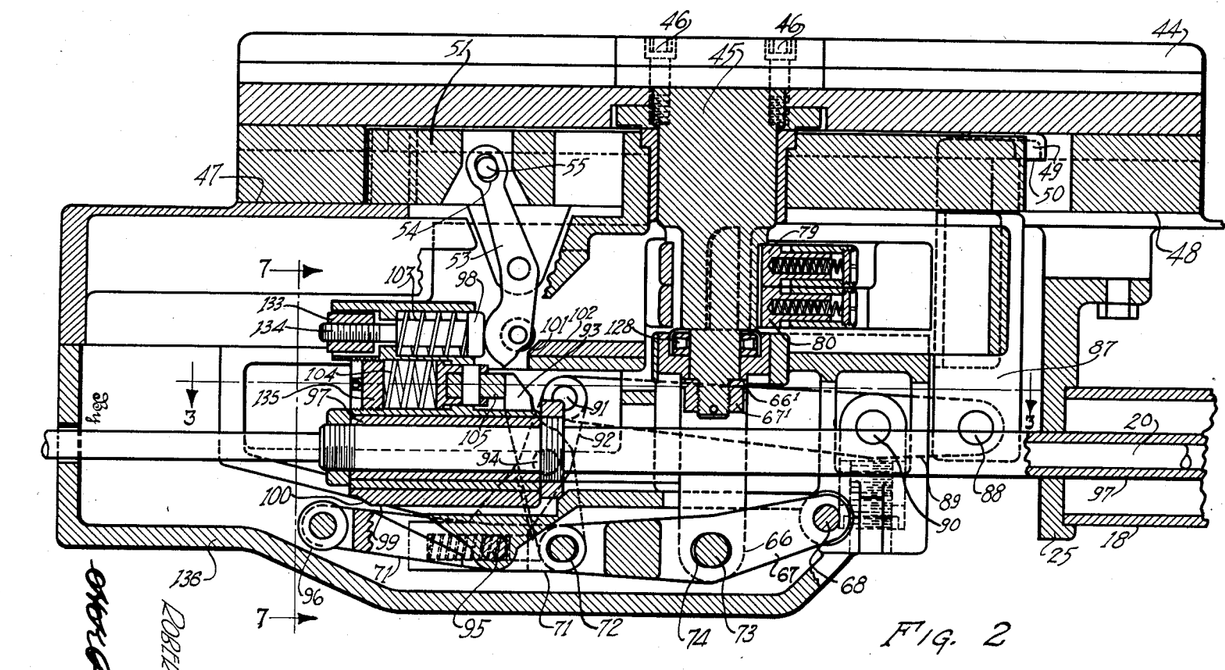
Figure 2 is a longitudinal section through the work support of the machine showing the indexing mechanism.
Figures 4, 9:
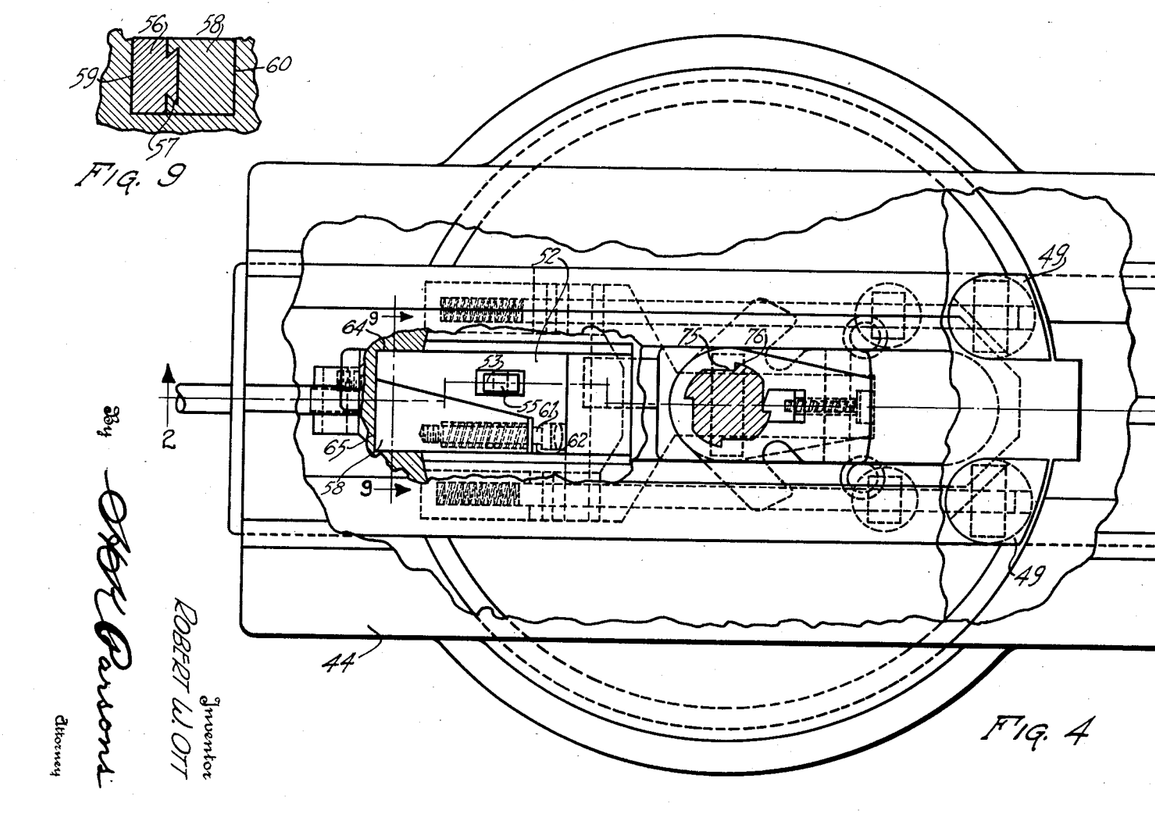
Figure 4 is a plan view of the index table partially cut away to show the indexing mechanism.
Figure 9 is a section through the locking bolt on the line 9—9 of Figure 4.

During the cycle just described it is assumed that a constant volume of oil is confined in the spaces 41 and 42 thereby preventing relative movement of the inner cylinder 43 with respect to the outer cylinder 18. The inner cylinder is utilized for effecting indexing of the table 44 mounted on the carriage 12. The table 44 is secured to the upper end of a rotatable member 45, as shown in Figure 2, by means of suitable screws or bolts 46. The table is provided with a frictional surface 47 which engages the clamping surface 48 formed on the carriage and hold down clamps 49 which engage an inner annular ledge 50 of the table serve to securely hold down and clamp the table on the carriage. To insure proper rotational positioning of the table, a locking bolt 51 has been provided, which is shown more particularly in Figure 4. The locking bolt comprises two parts, one of which, 52, is secured to the end of the bell crank 53 which has an elongated slot 54 in the end thereof for receiving the pin 55 secured in the member 52. This member has a tapered portion 56 which has a dovetailed guide 57 formed on one face thereof for receiving a second member 58 slidably mounted on the guide. The member 58 is tapered oppositely to the member 56 thereby resulting in the outside faces 59 and 60 of the two members being parallel and remaining parallel irrespective of the longitudinal position of one with respect to the other. The member 58 has a bolt 61 threaded in its narrow end which passes through a bore 62 in the member 52 and has its head counter-sunk in the end of the member. A spring 63 is interposed between the members 52 and 58 to constantly urge the members apart. The locking bolt is thus automatically adjustable for wear as it is apparent that when the member 58 is in an extended position the width between the faces 59 and 60 will be narrower than when the part 58 is in a return position. This also facilitates the entry of the locking bolt into the notch 64 of the table. The operation is as follows:

Upon entry of the locking bolt into the notch the end of the part 58 will engage the end wall 65 and upon continued movement of the part 52 will cause the surfaces 59 and 60 to spread apart and fill the notch. Upon withdrawal the head of the bolt 61 will positively withdraw the member 58 after a slight initial movement of the member 52.

Figure 3:
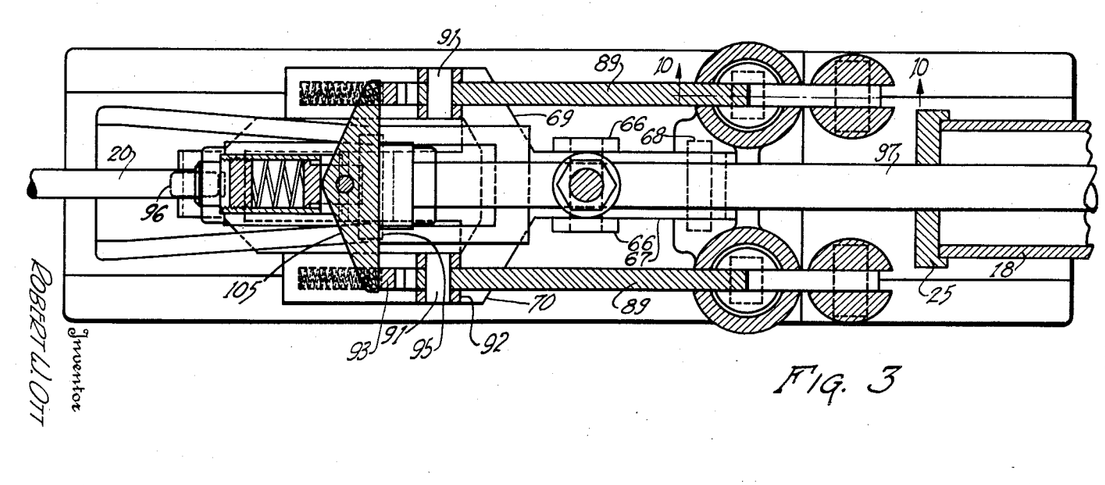
Figure 3 is a section on the line 3—3 of Figure 2.

In order to facilitate indexing of the table and to reduce frictional losses, the shaft 45 is moved vertically a sufficient amount to separate the surfaces 47 and 48. This is accomplished by providing the lower end of the shaft with a bifurcated member 66 which is journaled at one end on the reduced portion 66' of the shaft 45. A nut 67' is threaded in the end of the shaft to hold the parts together for vertical movement as a unit, while still permitting relative rotational movement of the shaft 45 with respect to member 66. An antifriction bearing, such as 128, is interposed between shoulders on the shaft 45 and the member 66 to minimize frictional losses. The bifurcated end of the member 66 embraces a lever 67 which is pivoted at 68 to a fixed part of the carriage. The opposite end of the lever 67 is forked providing two arms 69 and 70, as shown in Figure 3, each of which is pivotally connected to the end of an operating lever 71 by means of pins 72. A pin 73 is fixed in the end of the member 66 and engages elongated slots 74 formed in the member 67. The operation is such that upon clockwise rotation of the lever 67 caused by the operating lever the shaft 45 will be moved vertically and the table raised slightly.

While the table is in this raised position the indexing operation takes place. In the present instance the table is rotated at 180 degrees at each index movement although if desirable other angles of rotation could be selected.

Figure 5:
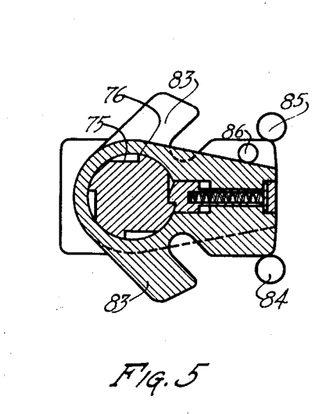
Figure 5 is a detail showing the position of the operating parts at the beginning of an indexing operation.
Figure 6:
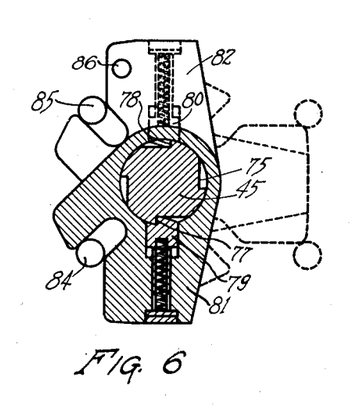
Figure 6 is a detail showing a position of the operating parts at the completion of 90 degrees of rotation of the index table.
Figure 7:
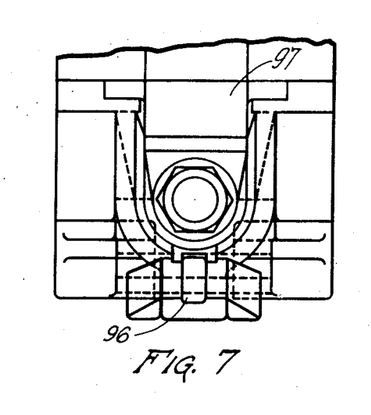
Figure 7 is an end view taken on the line 7—7 of Figure 2.

The shaft 45 is provided, as shown in Figures 4, 5 and 6, with a plurality of notches 75 each of which has a face 76 parallel to a radial line and adapted to be engaged by the face 77 or 78 of the spring pressed plungers 79 or 80. Attention is invited to the fact that each of these plungers is mounted in a separate member. The plunger 79 is mounted in the member 81 and the plunger 80 in the member 82. Each of the members is provided with a wing, such as 83, forming a sort of hook. From Figure 5, it will be noted that these wings project from opposite sides of the members. A pair of abutments or pins 84 and 85 are fixed to a movable slide and adapted to be reciprocated by the cylinder 43 to index the table. In Figure 5 the parts are shown in a return position and ready to execute indexing of the table. Upon movement of the parts 84 and 85 from the dotted position shown in Figure 6 to the full line position the member 81 will be rotated in a clockwise direction while the member 82 will be rotated in a counter clockwise direction. This causes the plunger 79 in engagement with the face 77 of the shaft 45 to rotate the shaft and thereby the table through an arc of 90 degrees. Simultaneously therewith, the movement of the member 82 has caused the plunger 80 to withdraw and ride over the periphery of the shaft 45 to the position shown in Figure 6 where it engages the next ratchet tooth. This operation is similar to a ratchet movement. Upon return of the parts 84 and 85 to their original position the member 81 will ratchet back while the member 82 will rotate the shaft and thereby the table in the same direction through an additional arc of 90 degrees thereby completing the indexing movement of 180 degrees.

Attention is invited to the fact that the rotation of the table is a modified form of harmonic motion which reduces the possibility of overrun, due to momentum of the parts, but, if desired, a stop pin, such as 86, may be provided to insure accurate positioning of the parts and positively prevent any overrunning thereof.

Upon completion of the indexing movement the table is accurately positioned by the locking bolt 51 and then lowered and clamped by the members 49. The hold down clamps are each fixed to the end of a reciprocable plunger 87. These plungers are pivoted at their lower ends by means of pins 88 to the levers 89 which are pivoted at 90 to adjustable supports 90'. As shown in Figure 10 the member 90' is fitted in a bore 130 with sufficient tightness to support its own weight and that of the lever 89. The lower end of the member is reduced in diameter and threaded for receiving the nut 131 which bears against a plug 132 pressed in the orifice of the bore 130 to effect a downward adjusting movement of the center 90. The upward thrust during a clamping action is absorbed by the nut and plug 132 bearing against a fixed part of the slide. Each lever 89 is also pinned at 91 to a crank lever 92. A second lever 93 is pivotally connected to each of the levers 92 as at 94 and has one of its ends journaled on the pin 72 which forms the connection between the operating lever 71 and the lever 67.

The operating lever is pivotally mounted to a fixed part of the carriage at 95 and has a roller 96 journaled in the free end thereof. The cylinder 43 has projecting from one end the cylinder sleeve 97 to the end of which is attached the reciprocable member 97' which is mounted for independent movement relative to the carriage and has mounted thereon the abutments or pins 84 and 85 which operate the indexing mechanism, the resilient abutment 98 for operating the bell crank 53 of the locking plunger and a cam surface 99 on the underside thereof for operating the lever 71. Relative movement of the sleeve 97, with respect to the slide, to the left, as shown in Figure 2, will cause the cam surface 100 to engage the roller 96 thereby depressing the free end of the lever 71 and raising the pivot 72 causing the arms 92 and 93 to fold together toward a horizontal position resulting in upward movement of the plunger 87 as well as upward movement of the shaft 45.

The cam surface 101 will simultaneously cause withdrawal of the locking bolt whereupon the parts are in position for the pins 84 and 85 to index the table upon continued movement of the sleeve 97. It will be noted that the cam surface 99 and the surface 102 will hold the parts in this position during the forward and return movement of the pins 84 and 85 after which the parts will be returned to normal position. This is effected by the abutment 98 engaging the rounded end of the lever 53, and the equalizer bar 105 engaging the ends of the levers 93. Attention is invited to the fact that each abutment is under initial spring pressure whereby under normal operation the abutment does not yield. This is accomplished in the case of member 98 by providing a nut 133 on the threaded portion 134 whereby the abutment may be drawn into its socket putting sufficient compression in the spring 103 for normal operation while still permitting the abutment to yield under heavy load. In the instance of the member 105 the spring 104 is put under initial compression by the threaded plug 135. Upon completion of the indexing movement the member 97 is placed under tension, by means to be described later, to prevent any undesired movement of the table during the machining operation and thus the yielding abutments insure maintaining the parts in proper relation to one another.

The cylinder 43, previously referred to, as the actuator of the indexing operation, is reciprocably mounted within the cylinder 18 and is capable of independent movement with respect thereto upon the admission of pressure in the proper chambers. Referring to Figure 1, the cylinder 43 is shown in the position that it assumes during the return of the carriage from a cutting stroke but before the indexing operation has taken place. In the position shown pressure is being admitted to the chamber 106 and exhausted from the chamber 107 while the chambers 41 and 42 are filled with a constant volume of oil. As long as fluid can neither enter nor leave the chambers 41 or 42 relative movement of the cylinder 43 with respect to the cylinder 18 is prevented and, therefore, the admission of pressure to the chamber 106 will cause movement of all the parts as if they were integral while admission of pressure to the chamber 107 will simultaneously cause movement to the right of all the parts as a unit. It is thus seen that so long as the two chambers 41 and 42 are closed the device operates as a simple piston and cylinder. However, in order to effect indexing of the table relative movement of the cylinder 43 with respect to the cylinder 18 must be effected and this is accomplished by releasing the fluid in the chamber 41 and admitting fluid to the chamber 42 simultaneously with the admission of pressure to chamber 106 and exhaust from chamber 107. The chamber 41 is connected by a port 108 formed in the end wall 25 of the cylinder 18 to an external pipe 109 which leads to a port 110 formed in the opposite end wall of the cylinder 18 which port is adapted to register with a port 111 formed in the fixed piston rod 20. The port 111 forms one terminus of a channel 112 which terminates at the cut-off valve 114.

Fluid is admitted to the other chamber 42 by means of a port 115 formed in the piston rod which is the terminus of a channel 116 formed in the fixed piston rod and connected with an external pipe 117 also leading to the cut-off valve 114. This valve has a pair of spools 118 and 119 mounted upon a plunger rod 120 which projects from one end of the cylinder and is adapted to be engaged by a dog 121 carried on the front edge of the reciprocating carriage for sliding the valve to effect the proper connections to initiate the indexing movement. A spring 122 is interposed between the spool 118 and the end of the valve cylinder to cause return movement of the valve upon departure of the dog 121. A channel 123 extends from the valve 114 to the reversing valve 30 and is there connected with the channel 28. A second channel 124 parallel therewith connects with the channel 29. It is thus seen that upon the admission of pressure to the channel 28 and thereby to the chamber 106 that pressure will simultaneously be admitted to the pipe 123 and thereby upon movement of the spool 118 to the left, as shown in Figure 1, to the channel 117 and thereby to the chamber 42. When the channel 28 is connected to pressure, the channel 29 is simultaneously connected to a return line, which will cause pipe 124 to be an outlet and upon movement of the spool 119 to the left will permit fluid in the chamber 41 to return to the reservoir. The cut-off valve 114 is provided for the purposes of incapacitating or cutting-off the ports 111 and 115 except when it is desired to effect an indexing movement, as otherwise reciprocation of the cylinder over the fixed piston rod will cause registry of these ports first with chamber 42 and then with chamber 107 and cause disruption of the circuit.

The operation is as follows:

During the return movement of the table from a cutting stroke chamber 106 is under pressure while chamber 107 is connected to reservoir and the chambers 41 and 42 are closed. This return movement will continue until the port 110 registers with the port 111 and the port 115 is in communication with chamber 42. This will immediately connect chamber 41 and 42 with the cut-off valve. This valve will now open upon dog 121 engaging the piston rod 120 of the cut-off valve 114 thereby connecting chamber 41 to exhaust and 42 to pressure. This will cause relative movement of the cylinder 43 with respect to the cylinder 18 to the left and thereby effect indexing of the table. Upon completion of the indexing movement the reversing valve 30 will be shunted by dog 36 to reverse the direction of flow in the pipes whereupon pressure will be admitted to the chamber 41 and exhausted from the chamber 42 simultaneously with the admission of pressure to the chamber 107 and the exhaust of pressure from the chamber 106. This will cause relative movement of the cylinder 43 with respect to the cylinder 18 to the right thereby completing the indexing movement. Upon engagement of the cylinder head 126 with the cylinder head 25 movement of the carriage to the right will commence while at the same time the dog 121 will leave the piston 120 permitting the cut-off valve to close thereby rendering the ports 111 and 115 dead, and at the same time trapping the fluid that happens to be in the chambers 41 and 42 thereby preventing relative movement between the cylinder 43 and the cylinder 18 during feeding stroke of the table. At the completion of the feeding stroke the reversing valve 30 will again be shunted by the dog 40 causing reversal of flow in the pipes and changing the direction of movement of the carriage after which the foregoing cycle will be repeated.

From the foregoing it should now be apparent that a simple and satisfactory indexing mechanism has been provided which is of general application to machine tools that have an hydraulically actuated slide. Attention is invited to the fact that the operating and control levers of the mechanism are mounted in the lower part of the casing 136 which makes it possible to submerge the parts in oil thereby insuring positive lubrication of all the moving parts. This is accomplished without interfering with the adjustability of or access to nut 131, shown in Figure 10. It will be noted that the sleeve 97 upon completion of an indexing movement tends to draw all the control levers toward a common center which insures locking of all the parts and adds to the unity of operation of the device and the efficiency of the mechanism as a whole.

That which is claimed is:

1. A milling machine having a support, a pair of guide ways formed on the top of the support, a piston rod intermediate the guide ways and extending parallel therewith tensioned between the ends of the support, a piston fixed on the piston rod, a slide having an index table thereon reciprocably mounted on the guide ways and having a cylinder depending therefrom and surrounding said piston, a second cylinder enclosed within the first and connected to the index table, and hydraulic means acting in each cylinder in timed relation with the reciprocation of the slide to effect indexing of the table.

2. A hydraulically actuated machine tool comprising a reciprocating slide, an index table mounted on said slide, hydraulically actuated means for reciprocating the slide and indexing the table including a fixed piston rod, a piston integral therewith, an inner cylinder enclosing said piston and reciprocably mounted on said piston rod, ports in the piston rod adjacent opposite sides of the piston for introducing pressure to opposite ends of the cylinder, an outer cylinder attached to the slide reciprocably mounted on the inner cylinder and enclosing the same, additional ports formed in the piston rod for admitting pressure to opposite ends of the outer cylinder, means to connect the inner cylinder to the table to effect indexing thereof, a source of pressure, and control means for admitting pressure to said ports in timed relation to effect indexing of the table at the end of each return stroke of the slide.

3. A machine tool having a reciprocating slide, an index table carried by the slide, hydraulic means for effecting reciprocation of the table including a fixed piston and a cylinder depending from the slide and enclosing said piston, an inner cylinder reciprocably mounted within the first named cylinder and connected to said index table, means to maintain a constant volume in the opposed chambers of the outer cylinder while alternately connecting the opposed chambers of the inner cylinder to pressure to effect reciprocation of the slide, and additional means to connect the opposed ends of the outer cylinder alternately to pressure and exhaust to effect relative movement of the inner cylinder with respect to the outer cylinder and thereby indexing of the table.

4. A milling machine having a support, an hydraulically actuated translatable element mounted on the support, an index table carried by the element and pivotally mounted thereon, said pivot comprising a shaft journaled in the element and attached to the under side of the table, ratchet teeth formed in the periphery of the shaft and extending longitudinally thereof, a pair of ratchet members surrounding said shaft, each having a spring pressed pawl in engagement with said teeth, and means to rotate the ratchets through equal angles in opposite directions and return whereby the table will be indexed through half of its movement by one ratchet and through the remainder of its movement by the other ratchet.

5. A milling machine having a reciprocating carriage, an index table mounted on the carriage, hydraulic means for effecting reciprocation of the carriage, a slide reciprocably mounted on the carriage, hydraulic means for effecting reciprocation of the slide at the end of each return stroke of the carriage, a bolt for locking the table to the carriage, ratchet means for indexing said table, cam means carried by the slide for retracting the locking bolt, additional means carried thereby for indexing the table, and resilient abutment means for returning the bolt t the completion of the indexing movement.

6. A milling machine having a reciprocating slide and an index table rotatably mounted on the slide, means to rotate the table to effect indexing thereof, and means to lock the table to the slide including a locking plunger composed of two sections having angular faces dove-tailed together and capable of relative longitudinal movement, resilient means for maintaining the parts in longitudinally displaced positions one protruding beyond the other to thereby reduce the width of the plunger, and operating means pivotally connected to one section to force the plunger into engagement with a locking notch of the slide causing the protruding section to engage the bottom of the notch and move inward thereby increasing the width of the plunger to completely fill the locking notch.

7. A milling machine having a reciprocating carriage, an indexible table pivotally mounted on the carriage, a locking bolt for accurately positioning the table, hold down clamps for securing the table to the carriage, an operating slide reciprocably mounted on the carriage and having means during movement in one direction to release the hold downs, withdraw the locking bolt, raise the table and effect indexing thereof through a predetermined angle, and operable upon its return movement to index the table through an additional equal angle, effect lowering of the table, return of the lock bolt and clamping of the hold down, and hydraulic means for reciprocating said slide.

8. A milling machine having a reciprocating slide and an index table thereon, means to reciprocate the slide comprising a fixed piston, a movable cylinder attached to the slide, an inner cylinder contained therein forming chambers in the opposite ends thereof, means to simultaneously maintain a fixed hydraulic volume in each chamber and to alternately admit pressure to opposite ends of the inner cylinder to effect reciprocation of the slide, indexing mechanism for the table coupled with the inner cylinder, and valve means to alternately admit pressure to said chambers to effect relative movement of the inner cylinder with respect to the movable cylinder and thereby actuation of said index mechanism.

9. A milling machine having a reciprocating slide and an index table thereon, means to reciprocate the slide comprising a piston and cylinder relatively movable with respect to each other, an inner cylinder contained in the first named cylinder forming independent chambers in opposite ends thereof, means to maintain a fixed hydraulic volume in each chamber including a cut-off valve, means to simultaneously admit pressure to opposite ends of the inner cylinder to effect reciprocation of the slide, indexing mechanism for the table operatively coupled with the inner cylinder, means carried by the slide effective on the cut-off valve upon return of the slide to admit pressure alternately to said chambers to effect indexing of the table.

10. A milling machine having a reciprocating slide, an index table mounted on the slide, a vertical shaft attached to the underside of said table, and journaled in the slide, means attached to the end of said shaft acting through a thrust bearing for effecting reciprocation of the shaft and thereby raising of the table, ratchet means engaging the shaft and operated in timed relation with the reciprocation of the slide for imparting rotary harmonic motion to the table to effect indexing thereof while in a raised position and hydraulically actuated mechanism for operating both of said means.

11. A milling machine having a support, a pair of guideways formed on the top of the support, a piston rod mounted intermediate said guideways and fixed at opposite ends to said support, a piston fixed on said piston rod, a slide having an indexible table thereon reciprocably mounted on the guideways for movement parallel to said piston rod, a cylinder depending from the slide and inclosing said piston, a second cylinder reciprocably mounted within the first cylinder, means operatively connecting the second cylinder to the table to effect indexing thereof, a source of hydraulic pressure and a plurality of channels formed in the piston rod and connected to said pressure for conducting the same to opposite ends of the second cylinder to effect reciprocation of the support and to the first cylinder to effect indexing of the table.

12. A milling machine having a reciprocating slide, an index table mounted on the slide, a vertical shaft depending from the under side of the table and journaled in said slide, means for effecting axial movement of said shaft and thereby elevation of the table including a pair of links pivotally connected to the end of said shaft, means for effecting rotation of the table while in an elevated position including ratchet mechanism and a power reciprocable member carried by the slide for effecting successive operation of said parts to effect indexing of the table.

13. A milling machine having a reciprocating slide, an index table rotatably mounted on the table, a vertical shaft depending from the under side of the table and journaled in said slide, means to effect elevation and rotation of the table including a linkage mechanism operatively connected to the shaft for elevating the table and ratchet mechanism operatively connected to the shaft to effect rotation of the table, an hydraulically reciprocable member carried by the slide, cam means on said member for actuating the linkage mechanism, and additional means operatively connected to the member for actuating said ratchet mechanism.

14. A milling machine having a reciprocating slide, an index table rotatably mounted on the table, a vertical shaft depending from the under side of the table and journaled in said slide, means to effect elevation and rotation of the table including a linkage mechanism operatively connected to the shaft for elevating the table and ratchet mechanism operatively connected to the shaft to effect rotation of the table, an hydraulically reciprocable member carried by the slide, cam means on said member for actuating the linkage mechanism, additional means operatively connected to the member for actuating said ratchet mechanism, a source of hydraulic pressure, an hydraulic motor for reciprocating said member, and means automatically controlled by movement of the slide for admitting pressure to said motor.

15. A machine tool having a support, a slide reciprocably mounted on the support, an auxiliary device carried by the slide, a first cylinder connected to the slide, a second cylinder reciprocably mounted in the first cylinder and forming a piston therein, a piston rod extending through opposite ends of both cylinders and fixed to said support, a piston formed on the rod within said second cylinder, means operatively connecting the second cylinder to said auxiliary device, a pair of ports formed in the piston rod on opposite sides of said piston for delivering fluid to the second cylinder, an additional pair of ports formed in the piston rod for delivering fluid to opposite ends of the first cylinder, a source of pressure, and means to control selectively the flow of pressure to said ports to thereby effect reciprocation of the slide and actuation of said auxiliary device in predetermined succession.

16. A milling machine having a support, a cutter spindle carried by the support, a slide, an indexible table carried by the slide, means to effect movement of the slide in one direction to present the work carried by the table to the cutter and retract the slide to permit indexing thereof, comprising a cylinder attached to the slide, a second cylinder reciprocably mounted within the first cylinder and forming a piston therein, a fixed piston rod extending coaxially through said cylinders and having a piston fixed thereon within the second cylinder, a first pair of delivery channels formed in the piston rod for delivering fluid to opposite ends of the first cylinder, a second pair of delivery channels formed in the piston rod for delivering fluid to the second cylinder, a source of pressure, a reversing valve, means connecting the source of pressure with the reversing valve, a first pair of conduits extending from the reversing valve to the first pair of delivering channels in the piston rod, a second pair of conduits extending from the reversing valve to the second pair of channels in the piston rod, and means to interrupt the flow in the second pair of conduits during movement of the slide toward and from the cutter, said means being automatically actuated thereby at the completion of its return movement to cause a flow in said conduits and thereby indexing of the table.

17. A machine tool having a support, a cutter spindle rotatably journaled in the support, a slide, an indexible table carried by the slide, means to effect movement of the slide and thereby the table toward and from the cutter spindle including a first cylinder, a second cylinder reciprocably mounted in the first cylinder and forming a piston therein, a piston rod extending coaxially through said cylinder and having a piston fixed thereon within the second cylinder, mechanism for indexing the table including an operating member operatively connected to the second cylinder, a reversing valve, a constant pressure line and a return line connected to said valve, a first and second conduit alternately connectible by the valve to the pressure line, said first conduit having a first branch line extending to one end of the second cylinder and a second branch line extending to one end of the first cylinder, said second conduit having a third branch line extending to the opposite end of the second cylinder and a fourth branch line extending to the opposite end of the first cylinder, means in the second and fourth branch lines for terminating flow therein, means simultaneously operable with said flow terminating means for locking the fluid in opposite ends of the first cylinder whereby flow in said first and third channels will effect reciprocation of the second cylinder and first cylinder as a unit to cause reciprocation of the slide, and means operative by the slide upon completion of a stroke in one direction to open said flow terminating means and thereby effect relative movement between the first cylinder and the second cylinder to index the table.

18. In a machine tool of the class described having a support, a translatable element mounted on the support, and a rotatable table carried by the element the combination of fluid operable means for effecting translation of the element and rotation of the table in predetermined automatic succession, including a fixed piston, a pair of independently movable telescoping cylinders, one of which is connected to the element and the other to the table, a common source of pressure for said cylinders, means connecting said pressure for joint movement of the cylinders whereby the element will be moved while the table will be held stationary relative thereto, and means for effecting relative movement between the cylinders to stop movement of the element and effect rotation of the table.

19. In a machine tool of the class described having a support, a translatable element mounted on the support, and a rotatable table carried by the element the combination of fluid operable means for effecting translation of the element and rotation of the table in predetermined automatic succession, including a fixed piston, a pair of independently movable telescoping cylinders, one of which is connected to the element and the other to the table, a common source of pressure for said cylinders, means connecting said pressure for joint movement of the cylinders whereby the element will be moved while the table will be held stationary relative thereto, and means for effecting relative movement between the cylinders to stop movement of the element and effect rotation of the table, said last named means including a plunger valve adapted to be dog actuated by the element.

ROBERT W. OTT.